March 13, 1956  R. A. SHIELDS  2,737,971
MULTIPLE SAFETY VALVE INTERLOCK
Filed Dec. 12, 1950  3 Sheets-Sheet 3

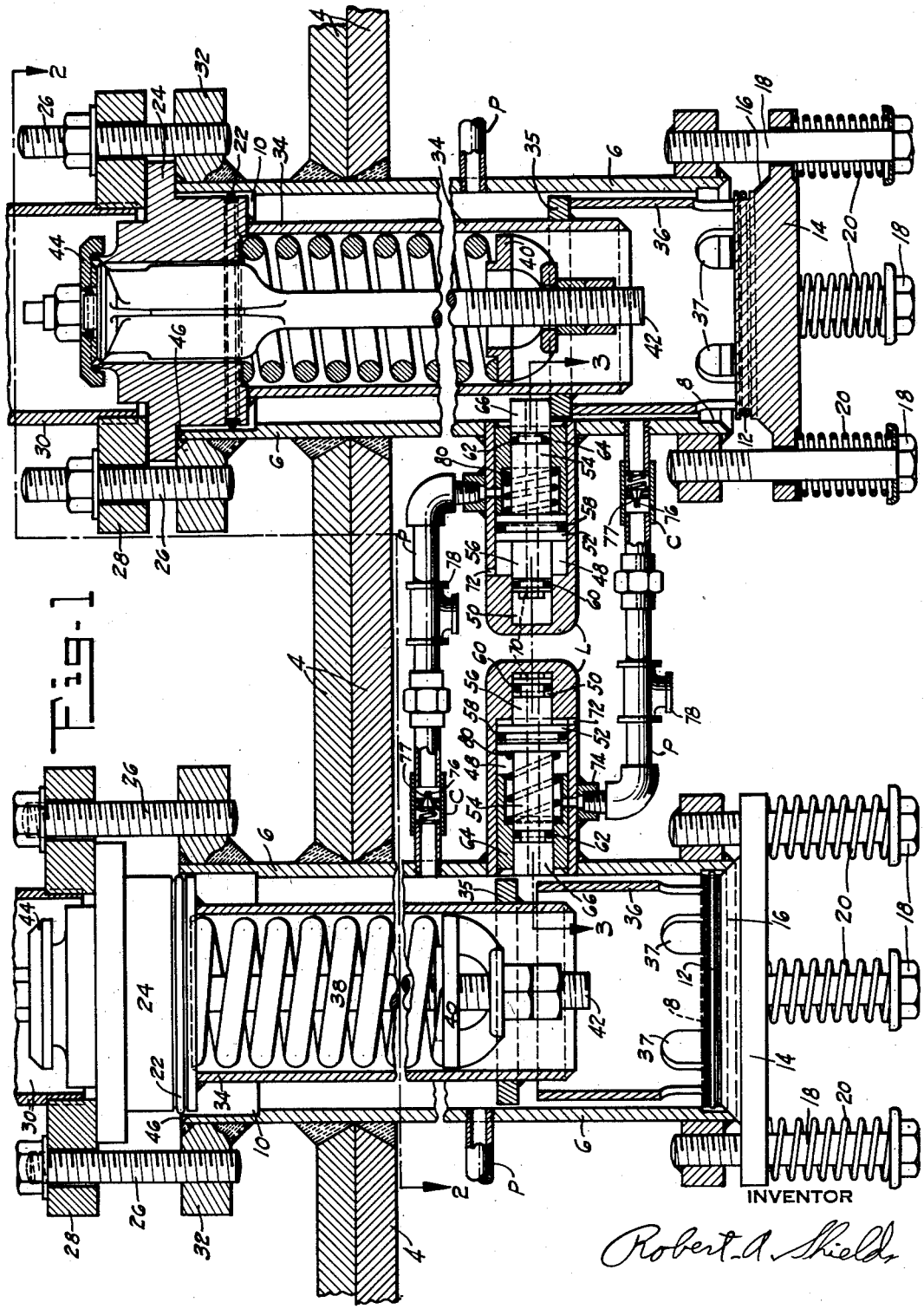

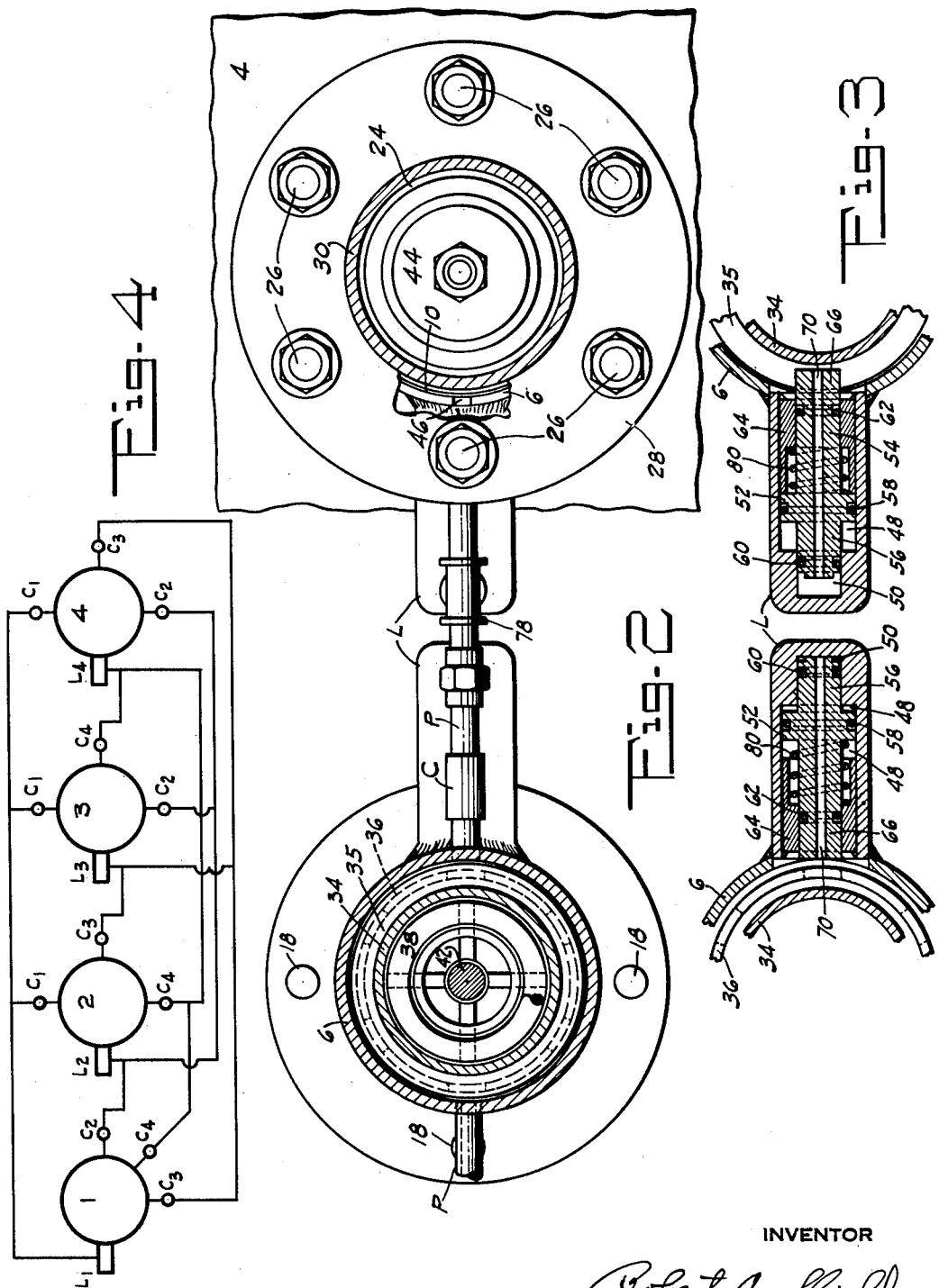

INVENTOR
Robert A. Shields

United States Patent Office 2,737,971
Patented Mar. 13, 1956

2,737,971

MULTIPLE SAFETY VALVE INTERLOCK

Robert A. Shields, Bloomsburg, Pa., assignor to American Car and Foundry Company, New York, N. Y., a corporation of New Jersey Application December 12, 1950, Serial No. 200,333

8 Claims. (Cl. 137—322)

This invention relates to safety valves in general and in particular to multiple safety valves for use with inflammable or corrosive gases in storage or transit and is a continuation in part of my application Serial No. 732,979, filed March 7, 1947, now Patent 2,538,335, granted January 16, 1951.

In the storage of highly inflammable or corrosive gases and liquids it is necessary that the containers be provided with safety valves, each or a combination thereof being of sufficient capacity as to fully protect the container. Under present systems one or more safety valves may be removed either intentionally or accidentally, leaving the storage tank without adequate protection and, since provision is made for removal under pressure, there is opportunity for deliberate sabotage with discharge of the contents of the container. By providing a plurality of safety valves, only one of which can be removed, it is possible to effect savings through the use of similar capacity valves than heretofore required. It is an object, therefore, of the present invention to provide a system containing a plurality of safety valves, only one of which can be removed at any one time.

A further object of the invention is the provision of a plurality of safety valves for a container so interconnected interior of the container as to prevent removal of more than one valve at any one time.

These and other objects of the invention will be apparent to persons skilled in the art from a study of the following description and accompanying drawings, in which:

Fig. 1 is a sectional view taken through a portion of the container and two of the safety valves;

Fig. 2 is a sectional view taken substantially on line 2—2 of Fig. 1 with certain parts broken away to better disclose the construction;

Fig. 3 is a sectional view taken substantially on line 3—3 of Fig. 1 and showing in detail the interlock cylinders;

Fig. 4 is a diagrammatic piping arrangement showing the manner in which four safety valve assemblies are interconnected;

Figure 5:
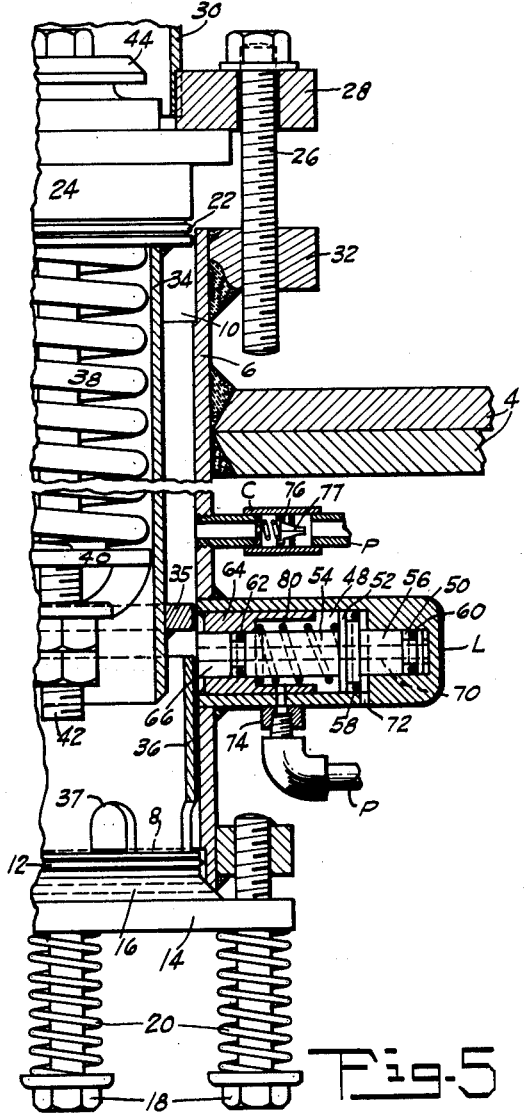
Fig. 5 is a sectional view of a slightly modified form of safety valve assembly and showing the safety valve ready to be removed.

Referring now to the drawings in detail it will be seen that the container walls 4 have welded therein tubes or sleeves 6 finished internally at the lower end as at 8 and at the upper end as at 10. The lower finished surface 8 is adapted to be engaged by a resilient packing ring 12 carried by a stop valve 14. This stop valve is provided with a metallic seat 16 adapted to engage a corresponding seat on tube or sleeve 6. Movement of the stop valve is guided by retaining bolts 18 and constantly urged toward a seated position on tube 6 by springs 20. The upper finished surface 10 of the tube or sleeve is adapted to engage a resilient packing ring 22 carried by safety valve body 24 clamped in position by means of bolts 26 and a ring 28 into which is fastened an exhaust stack 30. The bolts 26 are engaged in a collar 32 welded or otherwise secured to the upper or outer end of the tube or sleeve 6. The safety valve body has attached thereto a tubular extension 34 fitting within the sleeve 6 and to this tube is welded or otherwise secured a locking ring 35 which is adapted to engage a sleeve 36 welded or otherwise secured to the upper surface of stop valve 14. The lower edge of this sleeve 36 is provided with openings 37 through which gases may escape and pass upwardly to the safety valve. The safety valve itself is held on its seat by means of a spring 38 acting on the valve body 24 and a washer 40 carried by the valve stem 42. Sealing between the safety valve and body is accomplished by means of a metallic seat and resilient seal arrangement 44 more fully described in application 720,072, filed January 3, 1947, now Patent 2,599,622, granted June 10, 1952.

When it is desired to remove a safety valve, and neglecting for the time being any reference to the interlocking cylinders, it will be seen that when the safety valve assembly on the right side of Fig. 1 moves upwardly, due to unscrewing the nuts on bolts 26, the pressure within the sleeve 6 will cause the assembly to move upwardly in the sleeve with leakage prevented by the sealing ring 22. When, however, the assembly has shifted upwardly a sufficient distance the stop valve 14, which has been following the safety valve assembly upward under pressure of spring 20, will have become seated and following its seating and sealing the resilient ring 22 will pass above vent 46 and permit escape of pressure trapped between the safety valve seat and the stop valve seat. After this pressure has escaped through vent 46 the entire safety valve assembly may be completely removed from the sleeve 6 with the pressure retained in the container by the stop valve 14 through its metallic seat 16 and resilient seal 12.

In order to interlock the safety valves and prevent removal of more than one safety valve, lock cylinders L are welded or otherwise secured to the tubes or sleeves 6. These locking cylinders as clearly shown, have their inner ends projecting through an opening in the sleeve 6 and the interior surface is finished to provide an enlarged bore 48 and a reduced bore 50. A piston and rod assembly having an enlarged piston portion 52 and a long rod portion 54 and short rod portion 56 is mounted within the lock cylinder. The piston portion 52 is grooved to receive a resilient packing member 58, while the short rod portion 56 is grooved to receive a resilient seal member 60. The long piston rod portion 54 is grooved to receive a resilient sealing ring 62 adapted to engage and seal with a filler member 64 welded or otherwise secured in the open end of the lock cylinder L. Outwardly of the sealing ring 62 the rod 54 is provided with a locking end portion 66 adapted to project over the locking ring 35 of the safety valve assembly. Sealing rings 60 and 62 and accordingly the ends of the rods 54 and 56 are of the same cross-sectional area so as to give a balanced valve arrangement. It is to be noted that the rods 54 and 56 have a hole 70 bored therethrough which permits interchange of pressure between the ends of the piston rods. The chamber between packing ring 58 and the head of the lock cylinder is connected to the interior of the pressure container 4 by means of a small passage 72, while the chamber to the opposite side of the sealing ring 58 is vented to the exterior of the lock cylinder through a nipple connection 74.

As clearly shown in Figs. 1 and 4 each nipple 74 of each lock cylinder L is connected by piping P to the interior of each tube 6 other than the tube to which the lock cylinder is connected through a check valve assembly C, having the valve 76 thereof opening in a direction permitting flow of material under pressure into the interior of the associated tube 6 but preventing flow of material out of the tube through the piping. Certain of the check valves will be provided with a leakage passage 77 or a controlled by-pass. In any case the rate of leakage will be predetermined so as to control the time interval for release of the locks after reinsertion of a removed safety valve assembly. Connections to the various tubes will be made through the use of T's 78 or similar piping connections as clearly shown in Fig. 1. Referring specifically to Fig. 4 it will be seen that the circles designated 1, 2, 3 and 4 represent the entire valve assemblies and specifically the large tube 6 of the assembly and which can be closed either by the safety valve as shown at the right in Fig. 1 and in which case the entire tube is subject to container pressure, or the bottom may be closed as shown at the left of Fig. 1, in which case the interior of the tube is subject to atmospheric pressure. The small rectangles representing the locking cylinders are designated $L_1$, $L_2$, $L_3$ and $L_4$ corresponding respectively to the tube of the assemblies to which they are welded. Likewise, the various check valves C, which are connected in the lines to the respective locking cylinder, are given the same subscript as the locking cylinder to which they are connected. Thus it will be seen that the pipe extending from locking cylinder $L_1$ to assemblies 2, 3 and 4 has a check valve $C_1$ interposed in the pipe line adjacent each tube and controlling the flow of matter under pressure out of assemblies 2, 3 and 4 to the lock cylinder $L_1$. As previously stated certain of the check valves have a leakage passage therein, for example, check valves $C_2$, $C_3$, $C_4$ connected to assembly 1 and check valve $C_1$ connected to assembly 2. In other words one check valve in each line will be provided with a small leakage passage for the purpose of charging the pipe lines with pressure after return of a removed valve.

Assuming that check valve assembly 1 has been removed to the position shown in the left of Fig. 1, then the stop valve 14 will have closed and the interior of tube 6 will be at atmospheric pressure. The check valves $C_2$, $C_3$ and $C_4$ located adjacent assembly 1 will permit flow of material out of the pipe lines to which they are connected. Venting of material through check valve $C_2$ of assembly 1 will vent the chamber inclosed between sealing rings 58 and 62 of locking cylinder $L_2$, immediately causing the piston to move placing the locking end 66 above the locking ring 35 as clearly shown in the right hand of Fig. 1. Venting of material through the check valves $C_3$ and $C_4$ immediately adjacent assembly 1 will likewise cause immediate locking of the lock assemblies $L_3$ and $L_4$ respectively. Escape of material under pressure from assemblies 2, 3 and 4 into the pipe lines P is prevented by the check valves such as $C_3$ and $C_4$ immediately adjacent assembly 2, also by $C_2$ and $C_4$ immediately adjacent assembly 3 and by $C_2$ and $C_3$ immediately adjacent assembly 4. Locking cylinder $L_1$ does not move since the pipe line connected thereto is not venting, since assemblies 2, 3 and 4 are in position and locked in the closed position as shown in the right of Fig. 1. Thus it will be seen that removal of any one of the safety valve assemblies causes a venting of all pipe lines connected to the tube 6 from which the assembly is being removed and will cause all locking cylinders to move immediately to locked position, excepting that locking cylinder which is welded or otherwise secured to the tube 6 from which the safety valve assembly is being removed. It will also be seen that flow of material into the pipe lines is either prevented or under predetermined control by the various check valves C connected adjacent the tubes 6 of assemblies which are in position and under pressure.

Insertion of the removed safety valve assembly will bring the locking ring 35 into engagement with the stop sleeve 36 and upon pressure being applied through the nuts of bolts 26, the safety valve will be forced downwardly unseating stop valve 14 and again subjecting the interior of the tube 6 to pressure. Prior to this time, however, the sealing ring 22 and safety valve will have closed the upper end of tube 6, thus permitting immediate build up of pressure within the tube 6 as soon as the stop valve 14 has been unseated sufficiently to allow entrance of pressure. As soon as the pressure builds up in a tube into which an assembly such as 1 is being inserted, material will flow through leakage passage 77 in certain of the check valve assemblies and at a predetermined rate. As soon as the pressure has built up within the pipes to substantially container pressure, then the balanced condition of the locking cylinders will be reestablished and springs 80 will cause movement of the locking cylinder pistons to a retracted position such as shown in the left hand portion of Fig. 1.

From the preceding it will be seen that removal of any assembly causes immediate locking of all other assemblies and by means which is not under control of the person removing the assembly. The locking cylinder associated with the assembly being removed will not lock and accordingly can not hamper reinsertion of the assembly after necessary inspection and repair. When the assembly is again reinserted in its associated tube there will be a short interval of time before pressure will have built up in the previously vented pipe lines sufficiently to unlock the remaining assemblies. The time interval can be controlled through proper choice of the leakage passage or by-pass associated with certain of the check valves as pointed out. It is obvious that all of the check valves need not be provided with leakage passages, but that only one check valve in each pipe line need be provided with either a leakage or controlled passage.

Figure 6:
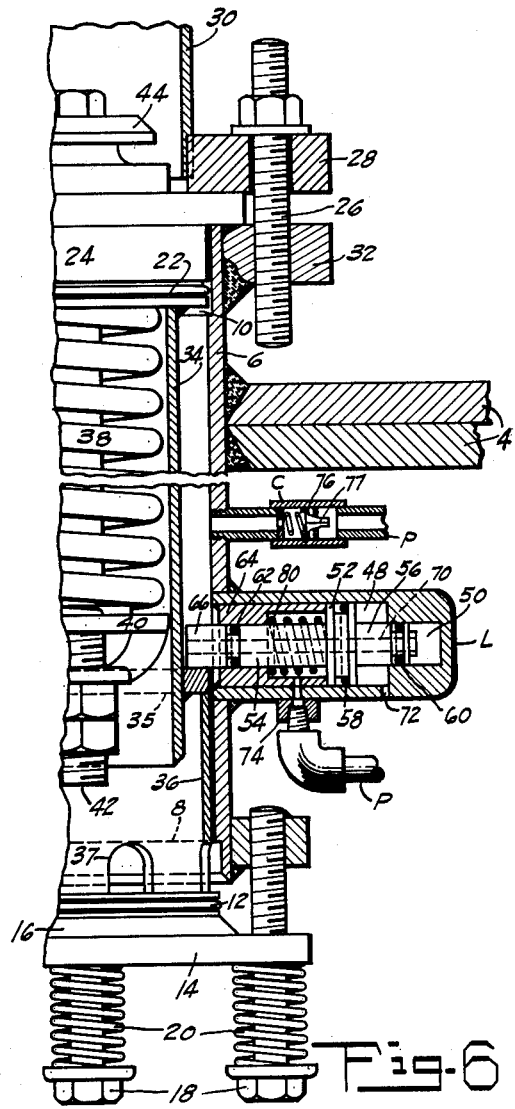
Fig. 6 is a sectional view of the valve of Fig. 5 but showing the parts in fully seated and locked position.
Figure 7:
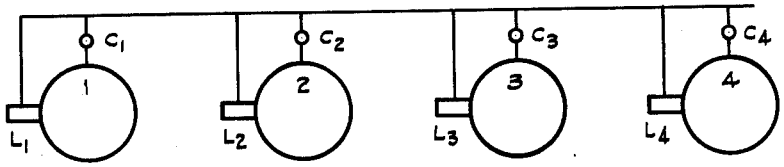
Fig. 7 is a diagrammatic view of a piping arrangement for connecting a plurality of safety valve assemblies such as shown in Figs. 5 and 6.

In the form shown in Figs. 5, 6 and 7 a slight modification has been made in order to simplify the piping arrangement within the container and wherever possible the same reference numerals have been applied as have been used in connection with Figs. 1 to 4 inclusive. In this form the sleeve 36 fastened to stop valve assembly 14 has quite close clearances with the interior walls of the associated tube 6. In this form when the safety valve assembly has been removed sufficiently to vent tube 6, as shown in Fig. 5, the locking end 66 will strike against the upper end of sleeve 36 thus preventing the locking end projecting into the tube a sufficient distance as to prevent the reentry of the safety valve into tube 6. In other words, the locking end 66 can not block the passage of locking ring 35, nor prevent this ring contacting the upper end of sleeve 36 in order that the assembly may force the stop valve off of its seat. Since the locking cylinder can not block reinsertion of the safety valve assembly, the piping can be much simplified as clearly shown in Fig. 7. In this simplified arrangement each valve assembly 1, 2, 3 and 4 requires in addition to its associated locking cylinder $L_1$, $L_2$, $L_3$ and $L_4$ only one check valve, namely, $C_1$, $C_2$, $C_3$ and $C_4$. These check valves are constructed similar to those previously described in that they normally prevent, or at least control, the flow of pressure out of the tube 6 into the pipe lines connecting the various assemblies and locking cylinders. At least two of the check valves will be provided with predetermined leakage passages 77 so that the pipe line can be recharged upon reinsertion of a safety valve assembly which has been removed.

It will be obvious that with this arrangement removal of a safety valve will cause all locking cylinders to move toward locked position, but the locking cylinder associated with the tube from which the safety valve is being removed can not move completely to a locked position since it is blocked by the extended sleeve 36 of the stop valve 14. Reinsertion of the removed safety valve will be possible due to the blocking of the associated locking cylinder and when pressure is reestablished in tube 6, then pressure can build up in the pipe line and permit moving of all locking cylinders to the unlocked position.

With the form as shown in Fig. 7 addition of a safety valve assembly requires only the addition of the safety valve with its associated locking cylinder and check valve C. With the form such as shown in Fig. 4 addition of a safety valve assembly will, of course, require not only addition of the safety valve assembly and its associated locking cylinder L, but will also require the addition of check valves in a quantity equaling one less than the total number of safety valves in use multiplied times two. In other words, the total number of check valves required will be the total number of safety valve assemblies involved minus one times the total number of the safety valve assemblies. It is accordingly obvious that for large groupings of valves the system shown in Fig. 7 is much more preferable.

What is claimed is:

1. A multiple valve system for pressure containers comprising, more than two tubes projecting into and secured to the container, a safety valve assembly closing the outer end of each of said tubes, a projection extending inwardly from each safety valve assembly, a locking ring secured to each of said projections, a stop valve secured to the inner end of each of said tubes, a sleeve secured to each stop valve and extending upwardly into the associated tube into engagement with said locking ring whereby said stop valve is normally held open by said safety valve projection but is adapted to close the inner end of the associated tube upon removal of the safety valve, lock means carried by each tube and all but one thereof being movable by pressure within the container into a position above the associated locking ring upon removal of any one safety valve to thereby prevent removal of but one safety valve at a time when said container is under pressure, piping connecting the locking means of each tube to the remaining tubes, and a plurality of check valves in said piping controlling flow of fluid under pressure from the tubes to said locking means.

2. A multiple valve system for pressure containers comprising, more than two tubes projecting into and secured to the container, a safety valve assembly closing the outer end of each of said tubes, a projection extending inwardly from each safety valve assembly, a locking ring secured to each of said projections, a stop valve secured to the inner end of each of said tubes, a sleeve secured to each stop valve and extending upwardly into the associated tube into engagement with said locking ring whereby said stop valve is normally held open by said safety valve projection but is adapted to close the inner end of the associated tube upon removal of the safety valve, lock means carried by each tube and movable by pressure within the container into a position above the locking ring to thereby prevent removal of but one safety valve when said container is under pressure, piping connecting the locking means together and to each tube, and a plurality of check valves each located in the piping adjacent a tube and controlling the flow of fluid under pressure from the tubes to said locking means.

3. A multiple valve system for pressure containers comprising, more than two tubes projecting into and secured to the container, a safety valve assembly closing the outer end of each of said tubes, a projection extending inwardly from each safety valve assembly, a locking ring secured to each of said projections, a stop valve secured to the inner end of each of said tubes, a sleeve secured to each stop valve and extending upwardly into the associated tube into engagement with said locking ring whereby said stop valve is normally held open by said safety valve projection but is adapted to close the inner end of the associated tube upon removal of the safety valve, lock means carried by each tube and movable by pressure within the container into a position above the locking ring to thereby prevent removal of but one safety valve when said container is under pressure, piping connecting the locking means together and to each tube, and a plurality of check valves each located in the piping adjacent a tube and controlling the flow of fluid under pressure from the tubes to said locking means, certain of said check valves being provided with leakage passages of predetermined area.

4. A multiple valve system for pressure containers comprising, more than two tubes projecting into and secured to the container, a safety valve assembly closing the outer end of each of said tubes, a projection extending inwardly into the associated tube from each safety valve assembly and movable out of the tube during removal of the valve assembly, a stop valve secured to the inner end of each of said tubes and normally held open by the safety valve projection but adapted to close the inner end of the tube upon removal of the safety valve, lock cylinders connected to each of said tubes, a piston in each cylinder and movable into engagement with said projection to control removal movement of the projection and associated valve assembly, a conduit connecting the lock cylinders to each other, other conduits connecting the interior of each tube to said first conduit, and a check valve in each of said other conduits to control flow of fluid under pressure out of said tubes into said first mentioned conduit.

5. A multiple valve system for pressure containers comprising, more than two tubes projecting into and secured to the container, a safety valve assembly closing the outer end of each of said tubes, a projection extending inwardly into the associated tube from each safety valve assembly and movable out of the tube during removal of the valve assembly, a stop valve secured to the inner end of each of said tubes and normally held open by the safety valve projection but adapted to close the inner end of the tube upon removal of the safety valve, lock cylinders connected to each of said tubes, a piston in each cylinder and movable into engagement with said projection to control removal movement of the projection and associated valve assembly, a conduit connecting the lock cylinders to each other, other conduits connecting the interior of each tube to said first conduit, and a check valve in each of said other conduits to control flow of fluid under pressure out of said tubes into said first mentioned conduit, certain of said check valves being formed with leakage passages of predetermined area.

6. A multiple valve system for pressure containers comprising, more than two tubes projecting into and secured to the container, a safety valve assembly closing the outer end of each of said tubes, a projection extending inwardly from each safety valve assembly, a stop valve secured to the inner end of each of said tubes and normally held open by the safety valve projection but adapted to close the inner end of the tube upon removal of the safety valve, lock cylinders connected to each of said tubes, a plurality of conduits each connecting each of said lock cylinders to the interior of the remaining tubes, and a plurality of check valves in said conduits adjacent each tube, certain of said check valves preventing flow of fluid under pressure from the tubes into the conduits and other of said check valves being provided with leakage passages of predetermined area to control the rate of flow of fluid under pressure from the tubes into the conduits.

7. A multiple valve system for pressure containers comprising, more than two tubes projecting into and secured to the container, a safety valve assembly closing the outer end of each of said tubes, a projection extending inwardly from each safety valve assembly, a stop valve secured to the inner end of each of said tubes and normally held open by the safety valve projection but adapted to close the inner end of the tube upon removal of the safety valve, lock cylinders connected to each of said tubes, a plurality of conduits each connecting each of said lock cylinders to the interior of the remaining tubes, and a plurality of check valves in said conduits adjacent each tube and operable to permit free flow of material under pressure from the conduits into the tubes and controlled flow at a predetermined rate from the tubes into the conduits.

8. A multiple valve system for pressure containers comprising, more than two tubes projecting into and secured to the container, a safety valve assembly closing the outer end of each of said tubes, a projection extending inwardly into the associated tube from each safety valve assembly and movable out of the tube during removal of the valve assembly, a stop valve secured to the inner end of each of said tubes and normally held open by the safety valve projection but adapted to close the inner end of the tube upon removal of the safety valve, lock cylinders connected to each of said tubes, a piston in each cylinder and movable into engagement with said projection to control removal movement of the projection and associated valve assembly, a first conduit connecting all of the lock cylinders together, a plurality of other conduits each connecting the interior of a tube to said first conduit, and a one-way check valve in each of said other conduits and operable to permit substantially free flow of matter under pressure into the tube from said first conduit, at least two of said check valves being provided with leakage passages providing a predetermined rate of flow from a tube into the first conduit.

References Cited in the file of this patent

UNITED STATES PATENTS

| | | |
|---|---|---|
| 568,572 | Hewson | Sept. 29, 1896 |
| 596,634 | Smith | Jan. 4, 1898 |
| 668,589 | Snider | Feb. 19, 1901 |
| 744,625 | Sarver | Nov. 17, 1903 |
| 1,105,061 | Carpenter | July 28, 1914 |
| 1,905,149 | Chryst | Apr. 25, 1933 |
| 1,995,910 | Wyeth | Mar. 26, 1935 |
| 2,258,376 | Clothier | Oct. 7, 1941 |
| 2,463,253 | Earle | Mar. 1, 1949 |
| 2,538,335 | Shields | Jan. 16, 1951 |